Figure 1:
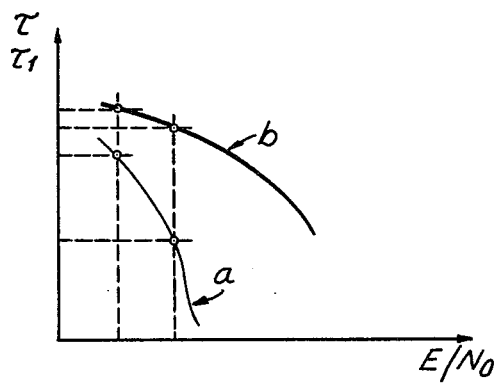

United States Patent [19]

Lainey et al.

[11] 4,091,240
[45] May 23, 1978

[54] BIT ERROR RATE PERFORMANCE MONITOR UNITS IN DIGITAL TRANSMISSION LINKS

[76] Inventors: Gilbert P. Lainey, 7, rue Hebert, 92140 Clamart; Daniel R. Duponteil, 45, rue Anatole, 92370 Chaville, both of France

[21] Appl. No.: 777,739

[22] Filed: Mar. 15, 1977

[30] Foreign Application Priority Data

Mar. 17, 1976 France .................. 76 08288

[51] Int. Cl.² .............................................. H04J 3/14
[52] U.S. Cl. .................. 179/15 BF; 179/175.2 C; 325/41; 340/146.1 AV; 340/146.1 BE
[58] Field of Search .................... 179/15 BF, 175.2 R, 179/175.2 C, 15 AD; 340/146.1 AV, 146.1 BE, 146.2; 325/41, 42

[56] References Cited

U.S. PATENT DOCUMENTS

| 3,277,268 | 12/1973 | Cleobury | 179/15 AD |
| 3,721,959 | 3/1973 | George | 325/41 |
| 3,873,775 | 3/1975 | Chown | 179/15 BF |
| 3,895,349 | 7/1975 | Robson | 340/146.1 AV |

*Primary Examiner*—David L. Stewart
*Attorney, Agent, or Firm*—Bierman & Bierman

[57] ABSTRACT

A bit error rate performance monitor unit for use in digital transmission links in which the signal input is equally divided between two demodulators of which one is disturbed, the combined output of said modulators being fed to an adder, the output of said adder being connected to a counter for continuously counting the bit error rate of the link.

10 Claims, 6 Drawing Figures

BIT ERROR RATE PERFORMANCE MONITOR UNITS IN DIGITAL TRANSMISSION LINKS

The present invention relates to bit error rate performance monitor unit in digital transmission links under operation.

Presently, for measuring the quality of a digital transmission link, it is known to transmit a known sequence of bits on the link, then to compare the received sequence with the transmitted sequence, and finally to derive therefrom the bit error rate that provides the desired measure. That method has the drawback of reducing the traffic capacity of the link under test when it is being used permanently. When the link operation is interrupted to transmit the known sequence of bits the measure is limited on short period of time and consequently cannot reveal every temporary change in the link, such for instance as a temporary propagation fading.

Redundancy of groups of bits transmitted in normal operation may also be utilized, but when the bit error rate is low, the measure becomes slow and produces only a mean figure over a long time period during which short fluctuations may have occurred.

Practically it is of interest to have a substantially instantaneous measure of the quality of the digital transmission link.

As far as permanent performance monitoring of digital links is concerned, reference may be made to a first technical article issued in IEEE Transactions on Communication Technology, Vol. COM-16, No. 3, June 1968, by D.J. Gooding and entitled "Performance Monitor Techniques for Digital Receivers Based on Extrapolation of Error Rate" and a second technical article issued in IEEE Transactions on Communications, Vol. COM-23, No. 5, May 1975, by Benjamin J. Leon et al. and entitled "A Bit Error Rate Monitor for Digital PSK Links".

In the first-mentioned technical article, an extrapolation technique is studied using "pseudoerror" for use in estimating error rates for adaptative FSK and PSK receivers operating over fading channels. In the second mentioned article, some theoretical aspects of that extrapolation technique are considered.

A purpose of the present invention is to provide bit error rate performance monitor units in digital transmission links providing substantially instantaneous performance evaluation which overcomes the drawbacks of the devices using the above-mentioned methods.

According to a feature of this invention, there is provided a bit error rate performance monitor unit in digital transmission links wherein two demodulators have their respective inputs connected in parallel from the digital transmission link reception end, power of the signal delivered from the said digital transmission link being equally shared to the two demodulator inputs, the two demodulators being of identical structure, the first demodulator being correctly set while the second demodulator is disturbed, outputs from the two modulators being respectively applied to the inputs of a modulo-2 adder whose output is coupled to a counter.

According to another feature, the disturbance applied to the second demodulator reduces the slope of the bit error rate curve as a function of the signal-to-noise ratio.

According to another feature, with a digital phase-modulated transmission link, the said first and second demodulators each conventionally comprise a digital clock regenerator circuit delivering digital clock signal that is applied to the conventional assembly of other demodulator circuits, a phase shift being applied to output of the second demodulator digital clock regenerator circuit for substantially phase shifting said output before applying it to other second demodulator circuits.

According to another feature, in addition, the second demodulator input is connected from the output of a generator delivering either a modulated or unmodulated carrier having a frequency within the digital transmission link frequency band and a predetermined power.

According to another feature, between the digital transmission link reception end and the second demodulator input is a bandpass filter is serially connected whose frequency band is broader than the digital transmission link frequency band.

According to another feature, between the digital transmisssion link reception end and the second demodulator input parallel mounted is a delay circuit serially connected to an attenuator the output of which is added to the second demodulator input, time delay of said delay circuit and attenuation value of said attenuator being predetermined respectively.

Figure 2:
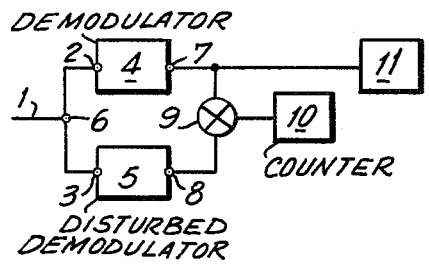
Figure 3:
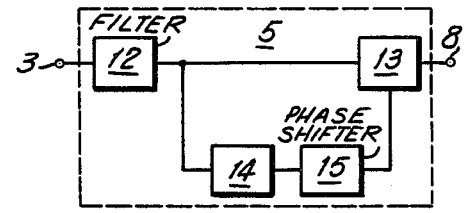
Figure 4:
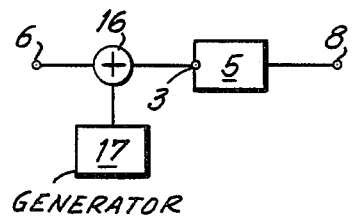
Figure 5:
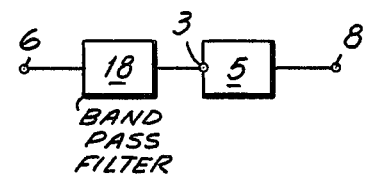
Figure 6:
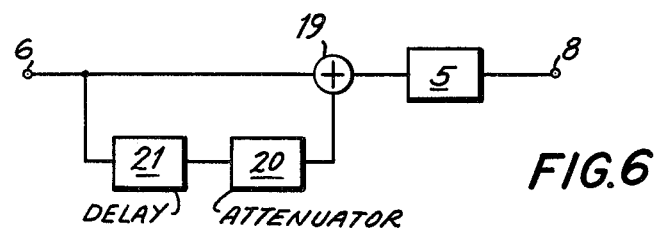

The above mentioned features as well as other features of this invention will appear more clearly from the following description of embodiments, the said description being made in conjunction with the accompanying drawings, wherein:

FIG. 1 show curves illustrating operation of performance monitor units according to this invention, FIG. 2 is a block diagram of a unit according to this invention, FIG. 3 is a block diagram of a first embodiment of a disturbed second demodulator included in the unit shown in FIG. 2, FIG. 4 is a block diagram of a second embodiment of a disturbed second demodulator included in the unit shown in FIG. 2, FIG. 5 is a block diagram of an alternative of the embodiment shown in FIG. 4, and FIG. 6 is a block diagram of another alternative of the embodiment shown in FIG. 4.

In FIG. 2, reception end of digital transmission link is connected to inputs 2 and 3 of the two demodulators 4 and 5 respectively. Assumption is made that power of the signal delivered from digital transmission link is is divided at junction point 6 into two equal parts respectively applied to inputs 2 and 3. Conventional means (not shown) might enable such a sharing. Respective outputs 7 and 8 of demodulators 4 and 5 are connected to inputs of a known modulo-2 adder 9. Output of adder 9 is connected to a known type of counter 10. In addition, output 7 of demodulator 4 is connected to the input of an operative circuit 11.

Demodulator 4 is correctly set or assumed to be so, while demodulator 5 has an intentionally disturbed operation. With $\tau_1$ representing the bit error rate at output of demodulator 4, $\tau_2$ representing the bit error rate at output of demodulator 5, and $\tau$ representing the ratio of the number displayed in counter 10 to the digital bit rate in digital transmission link 1, practically one obtains the relation:

$$\tau_2 - \tau_1 \leq \tau \leq \tau_2 + \tau_1$$

Indeed adder 9 delivers a pulse to counter only when signal respectively delivered from 7 and 8 are different.

In practice operation of demodulator 5 being disturbed while demodulator 4 operates at optimum conditions, $\tau_2$ is much higher than $\tau_1$. Therefore particularly when the quality of digital transmission link 1 is good the value $\tau$ provides an estimation of bit error rate $\tau_2$. Thus it appears that if demodulator 5 can be disturbed in a reproducible manner and relation $\tau = f(\tau)$ can be made determined from prior experiments or a computation, it is possible to determine $\tau$ from knowledge of $\tau_1$, that is the quality of the digital transmission link from which signals are transmitted toward operative circuits 11. As the circuit shown in FIG. 1 enables continuous counting the bit error rate of the link can be determined at every time.

FIG. 1 shows a curve $a$ that illustrates how $\tau_1$ varies as a function of E/No wherein E is the energy of a bit and No is the noise spectrum density, and a curve $b$ that illustrates how $\tau$ varies as a function of E/No. Those curves are utilized in the following manner: when a value $\tau$ has been determined from counter 10, the point having the corresponding ordinate is marked on curve $b$, then from that point a corresponding second point having the same abscissa is marked on curve $a$, and finally the ordinate of the said second point is determined which provides the value of $\tau_1$.

From examination of curves shown in FIG. 1, it appears that an amplification of the bit error rates is provided according the ratio $\tau/\tau_1$, and the lower is $\tau_1$ the higher is that amplification since slope of curve $b$ is smaller than that of curve $a$. In practice, certain methods used for disturbing the operation of a demodulator permit to obtain different slopes for those two curves but other methods may result in equal slopes for the two curves.

FIG. 3 shows the block diagram of a demodulator 5 shown in FIG. 2 the digital transmission link 1 being assumed to be phase modulated with multiple conditions. The demodulator shown in FIG. 3 comprises, like any phase modulation link demodulator, an input filter 12 receiving signals from input 3 and delivering filtered signals, on the one hand, to an assembly of conventional circuits 13 and, on the other hand, to a circuit 14 designed for regenerating the digital clock of digital transmission link 1 in a known manner. Circuit 14 delivers digital clock signals to a phase shifting circuit or phase shifter 15 whose output is connected to conventional control inputs of assembly 13, connected to output 8. The disturbance applied to operation of that demodulator consists in mismatching the phase shifter 15. Indeed signal delivered from 15 is used in 13 to control sampling of signal to be demodulated. There exists for 13 an optimum phase that corresponds to ideal presence times for bits. Thus the operation may be disturbed by varying the phase.

In an alternative thereof, in the case of coherent demodulation the carrier regenerated in demodulator 5 may be phase shifted by an angle $\phi$ while it is not phase shifted in demodulator 4. Then several curves similar to curve $b$ shown in FIG. 1 may be plotted for demodulator 5 as functions of various phase angles $\phi$. In practice, in the case of disturbances, it is known that the relation between measured bit error rate $\tau_1$ and count $\tau$ of counter 10 is, as described in the second above-mentioned article, of the type:

$$\log \tau \simeq \alpha(\phi) \log \tau_1 + \beta(\phi)$$

that gives $$\log \tau_1 = \frac{\log \tau - \beta(\phi)}{\alpha(\phi)}$$

In that relation functions $\alpha(100)$ and $\beta(\phi)$ are for instance determined from experiments and, as a result therefrom $\tau_1$ can easily be deduced from $\tau$ and $\phi$, through use of graphs that can be stored in a computer if necessary.

In another alternative, in the case of differential demodulation wherein a signal sample is compared with the preceeding signal sample delayed by a time duration corresponding to the time interval between two bits, that delay can be varied around an ideal value in demodulator 5 while it keeps the said ideal value in demodulator 4. Then curves $b$ are still plotted as functions of various delays and the same handling as described above is resumed.

In FIG. 4 there is shown a demodulator 5 disturbed according to another method. In this case, between junction points 6 and 3, there is provided a known circuit 16 that makes it possible to add a disturbing signal from a generator 17 to the signal transmitted from 6 to 3. Preferably generator 17 delivers a signal of unmodulated frequency within the frequency band of link 1 or a modulated signal the carrier frequency of which is within the said frequency band. Signal from generator 17 behaves like a noise applied to demodulator 5. The level of the signal delivered from 17 may be known with accuracy and several curves $b$, FIG. 1, can be plotted by varying such a level. Then it may be demonstrated that slopes of curves $b$ are smaller than the slope of curve $a$ which results in the above already mentioned amplification.

As a generator 17, a white noise generator may also be utilized but with such a noise generator no amplification effect is provided.

In FIG. 5, there is shown a demodulator 5 connected from a band filter 18 having a pass band enlarged with respect to the pass band of the input filter to demodulator 5. The result is the addition to input of 5 of an additional noise that directly related to the link noise. In practice, curves $b$ may be plotted as a function of the width of the pass band of filter 18. The determination of $\tau_1$ is then made in accordance with the description given in relation with the unit shown in FIG. 2.

In FIG. 6 there is shown a demodulator 5 connected from a circuit 19 whose one input is connected from junction point 6 and the other input is connected from the output of an attenuator 20 whose input is connected from the output of a delay circuit 21 whose input is connected from junction point 6. The signal applied to the second input of 19 is the same as that that is applied to the first input thereof, but delayed and attenuated, circuit 19 in a known manner providing the sum of those two signals before applying the said sum to demodulator 5. Delay of delay circuit 21 is of about the tenth of a bit duration. As a result demodulator 5 has its input disturbed in a relatively defined manner. Indeed signal from 20 operates as a noise whose level is firmly related to the signal level in link 1. Curves $b$, FIG. 1, can be plotted from experiments by varying attenuation in 20. Slopes of resulting curves $b$ are different from the slope of curve $a$ which makes it possible to get the already mentioned amplification effect.

While the invention has been illustrated in various circuit configurations, changes in the circuitry to the use of other components known to those skilled in this art are contemplated and the invention is not limited to the specific circuitry illustrated except as recited in the claims which follow.

What is claimed is:

1. A bit error rate performance monitor unit for use in a digital transmission link having a receiving end and an operative output end, comprising first and second demodulators having substantially the same structure, means connecting the receiving end of said data transmission link to the inputs of said demodulators, means connecting the operative output end to the output of said first demodulator, a module-2 adder having its inputs respectively connected to the outputs of said demodulators, a counter connected to the output of said adder, and means reproducibly disturbing the operation of said second demodulator, whereby the bit error rate can be determined from the counter reading divided by the operation period.

2. A bit error rate performance monitor unit according to claim 1, in which the means disturbing the operation of said second demodulator reduces the slope of the bit error rate curve as a function of the signal-to-noise ratio.

3. A bit error rate performance monitor unit according to claim 1 in which the means reproducibly disturbing the operation of said second demodulator comprises a generator and means injecting the output of said generator between the receiving end of said transmission link and the input of said second demodulator.

4. A bit error rate performance monitor unit according to claim 3, in which said generator delivers a pure carrier whose frequency lies within the digital transmission link frequency band.

5. A bit error rate performance monitor unit according to claim 3, in which said generator delivers a modulated carrier whose frequency lies within the digital transmission link frequency band.

6. A bit error rate performance monitor unit according to claim 1, in which the means reproducibly disturbing the operation of said second demodulator comprises a filter having a wider pass band, serially connected between the receiving end of said transmission link and the input of said second demodulator.

7. A bit error rate performance monitor unit according to claim 1, in which the means reproducibly disturbing the operation of said second demodulator comprises a delay circuit connected to the receiving end of said transmission link, an attenuator connected to the output of said delay circuit, and means connected to the input of said second demodulator adding the output of the receiving end of said transmission link to the output of said attenuator.

8. A bit error rate performance monitor unit for use in a digital phase-modulated transmission link having a receiving end and an operative output, comprising substantially identical first and second demodulators, each of which includes an operative digital clock regenerator circuit, means connecting the receiving end of said data transmission link to the inputs of said demodulators, means connecting the operative output end to the output of said first demodulator, a module-2 adder having its inputs respectively connected to the outputs of said demodulators, a counter connected to the output of said adder, and means comprising a phase shifter connected between th output of the digital clock regenerator and the output of said second demodulator for reproducibly disturbing the operation of said second demodulator, whereby the bit error rate can be determined from the counter reading divided by the operation period.

9. A bit error rate performance monitor unit for use in a digital phase-modulated transmission link having a receiving end and an operative output end comprising substantially identical first and second coherent demodulators each of which includes a carrier regeneration circuit providing a carrier frequency in the coherent demodulation operation, means connecting the receiving end of said data transmission link to the inputs of said demodulators, means connecting the operative output end to the output of said first demodulator, a module-2 adder having its inputs respectively connected to the outputs of said demodulators, a counter connected to the output of said adder and means comprising a phase shifter connected to the output of the carrier regeneration circuit of said second demodulator for reproducibly disturbing the operation of said second demodulator, whereby the bit error rate can be determined from the counter reading divided by the operation period.

10. A bit error rate performance monitor unit for use in a digital phase-modulated transmission link having a receiving end and an operative output end, comprising substantially identical first and second differential demodulators each including a delay line providing a delay time corresponding to the time interval between two bits, means connecting the receiving end of said data transmission link to the inputs of said demodulators, means connecting the operative end to the output of said first demodulator, a module-2 adder having its inputs respectively connected to the outputs of said demodulators, a counter connected to the output of said adder, and means adjusting the delay time of said second demodulator relative to the delay time of said first demodulator for reproducibly disturbing the operation of said second demodulator, whereby the bit error rate can be determined from the counter reading divided by the operation period.

* * * * *